Dec. 14, 1965  R. F. PIASECKI  3,223,776
CABLE-TAP CLOSURE DEVICE
Filed May 13, 1965
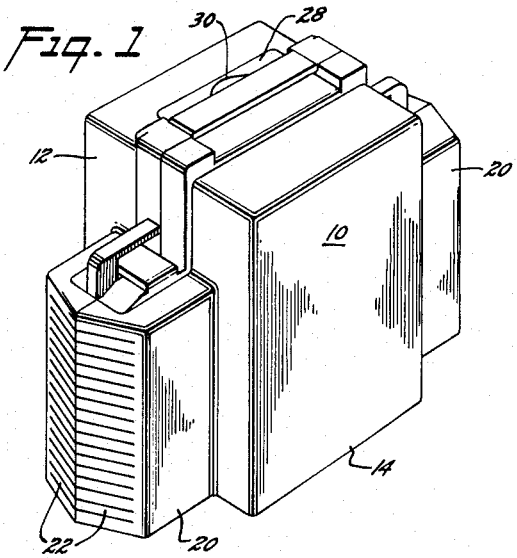
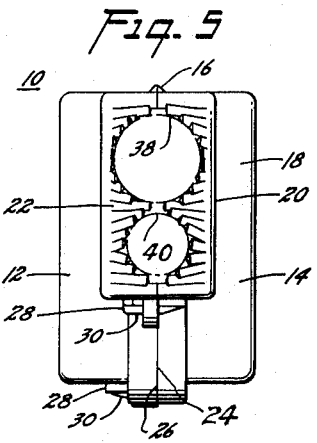
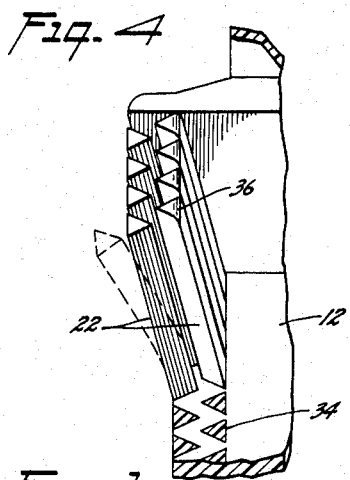
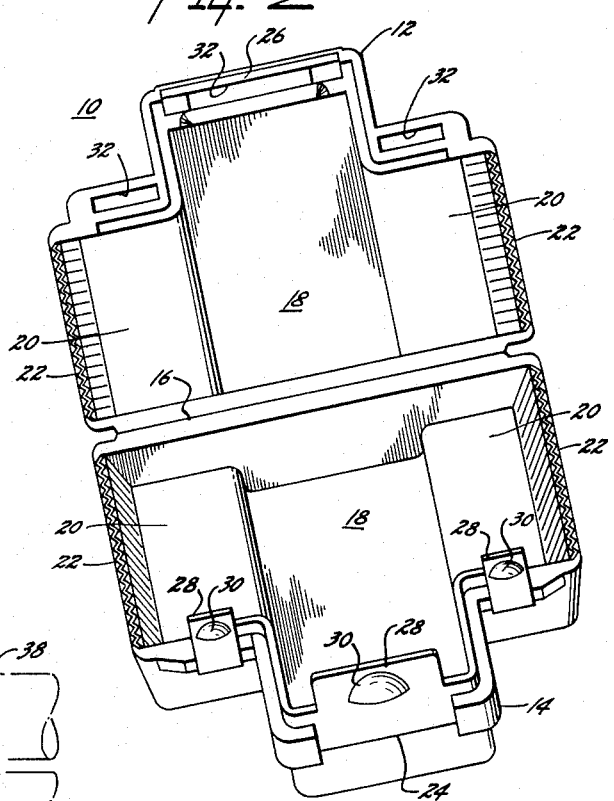
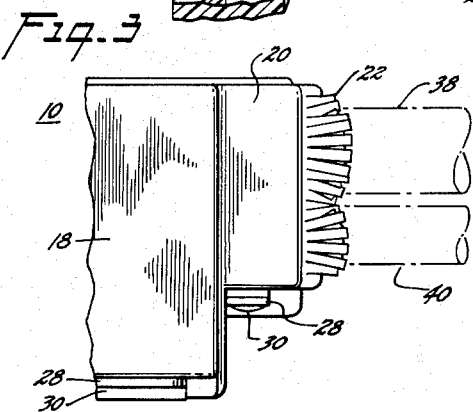
INVENTOR.
RAYMOND F. PIASECKI
BY
ATTORNEY.

United States Patent Office 3,223,776
Patented Dec. 14, 1965

3,223,776
CABLE-TAP CLOSURE DEVICE
Raymond F. Piasecki, Hazlet, N.J., assignor to The Thomas & Betts Co., Elizabeth, N.J., a corporation of New Jersey
Filed May 13, 1965, Ser. No. 455,488
3 Claims. (Cl. 174—138)

The invention relates to improvements in splice insulating devices adapted primarily for use on electric power cables at points thereon where a tap-off connection with an auxiliary or "lead-in" cable conductor section has been effected.

More specifically, the invention has reference to an improvement in a splice insulating closure member of molded polyethylene comprising two integrally hinged, complementary, box-like, half-sections having complementary latching means integral with and along one margin thereof.

The aforesaid improvement resides in the provision of parallel rows of fimbrilla or fringe-like strips or comb-like tines integral with and at the respective opposite ends of each half-section of the closure member which are inclined in alignment outwardly at an acute angle to the side faces thereof in closely nested, staggered relation whereby when the half-sections are closed on and about a cable tap connection, the joined, parallel conductors engage and flex, distend or bend the fringe-like strips or tines outwardly, substantially intermediate each row thereof and in accordance with the diameter of the respective conductors, in staggered, over-lapping relation on and about the periphery of the connected cable conductors passing through either one or both opposite ends of the closed, box-like closure device. Thus, the invention provides a complete, unitary box-like closure or housing of insulation material, for a cable tap-off connection, and also an effective closure or shield about the peripheral surface of the respective cable conductors whereby the entry of foreign matter into the tap connection closure member is obviated.

Closure devices of the character described, as known heretofore, possessed the disadvantage that they were not altogether adapted for completely encompassing, embracing or substantially shielding a pair of parallel cable conductors having a tap connection therebetween, when closed on and about said conductors at said tap connection with the result that the cable-tap connection was not completely or fully protected against the entry of foreign matter into said closure device.

Accordingly, it is an object of the invention to provide an improved enclosure and insulating device for receiving tap-off connections in electric power cables, as herein described, whereby the above noted disadvantage is obviated.

A further object of the invention is to provide an insulating enclosure device of the character herein described which is adapted, when closed on and about a cable-tap connection, to automatically embrace and form a substantial shield on and about the peripheral surface of a strung cable conductor passing through both ends of the closure device, including a parallel tap conductor connected to said cable conductor, also passing through either one or both ends of said closure device.

Another object of the invention is to provide an improved closure and insulating device of the character described which is simple in construction, readily secured on and about a cable-tap connection and effective for the purpose intended.

With the above and other objects in view, the invention resides in the novel construction, and configuration of elements, the novel features of which are set forth with particularity in the appended claims, the invention itself, however, both as to its organization and method of operation, together with additional objects and advantages thereof, being best understood from the following description of a specific embodiment thereof, when considered in conjunction with the accompanying drawing in which:

FIGURE 1 is an elevational view in perspective showing one fimbriated end wall of each box-like half-section of the closure device as yieldably locked together;

FIGURE 2 is a view in perspective showing the yieldably connected half-sections of the closure device, in full open position with the rows of fimbrilla or fringe like strips, constituting the opposite end walls of each half-section, in normal position;

FIGURE 3 is a fragmentary side view in elevation showing one fimbriated or fringe-like end of the box-like half-sections as closed on and about a cable tap-off connection with its respective conductors extending in substantial parallelism through said fringed end with its fimbriate strips embracing the peripheral surface of said cable conductors forming a substantial shield thereabout;

FIGURE 4 is an enlarged fragmentary perspective view of an end portion of one of said half-sections as constituted by a plurality of parallel rows of separately anchored, fimbrilla or fringe-like strips as disposed in closely staggered relation and inclined outwardly with respect to the remaining surfaces of said half-section; and FIGURE 5 is an end view in elevation of the closure device showing the fringe-like strips or comb-like tines as disposed on and about the respective peripheral surfaces of the cable conductors.

Referring to the drawing, the cable-tap closure device 10, as shown in FIGURES 1, 2 and 3, comprises a pair of complementary box-like, half-sections 12 and 14, yieldably connected along one longitudinal margin thereof as at 16, and molded as a unit of polyethylene plastic in sizes compatible with the diameter of a cable size with which the device is to be used.

In accordance with the invention, each of the connected half-sections 12 and 14, are divided into a main central compartment 18 of adequate width, length and depth for jointly accommodating or enclosing a cable-tap connection per se, and cable receiving end compartments 20 each defining a smaller, more shallow cavity bounded in part by a transverse yieldable barrier of fringe-like strips or comb-like tines 22 having a height compatible with substantially one-half of the diameter of a cable or larger one of two cables on which the device 10 is adapted to be closed.

At best shown in FIGURE 2, the half-sections 12 and 14 are provided along their free longitudinal margins 24 and 26 with a complementary latching means comprising a plurality of spaced tongues 28, each having a tooth-like detent 30 formed thereon and projecting laterally from the margin 24 of the half-section 14, and a corresponding number of complementary spaced slots 32 formed along the longitudinal margin 26 of the half-section 12 whereby when the half-sections 12 and 14 are closed upon each other with the respective longitudinal margins 24 and 26 in abutting engagement, the tongues 28 will yield and pass through their correlated slots 32 to yieldably lock the half-sections 12 and 14 together with their respective transverse rows of strips or tines 22 in alignment.

Further in accordance with the invention the fringe-like barrier or wall at the opposite ends of each box-like half-section 12 and 14 comprises a plurality of parallel rows of straight but yieldable comb-like tines or fringe-like strips 22 which are separately, integrally anchored, as at 34, and inclined outwardly at an acute angle to the sides of said half-sections 12 and 14 in closely nested, staggered relation by virtue of the triangular cross-section of each strip or tine 22 as best shown in FIGURE 4.

With further reference to FIGURE 4, the free ends of the inner row of the fringe-like strips or tines 22 are rounded or beveled, as at 36, whereby when the closure device 10 is placed over, on and about a cable or cables, the free rounded ends 36, of the inner row of fringe-like strips or comb-like tines 22 will automatically engage the peripheral surface of the cable or cables 38 and 40, at each end or side of the point of a cable-tap connection, and flex or bend substantially all of the strips or tines 22 in their direction of outward inclination into a random pattern of "brush-like" contact therewith substantially about the entire periphery of the tapped cable 38 and the cable-tap connection 40, as exemplified in FIGURES 3 and 4.

With further reference to FIGURE 4, it will be noted that the staggering of the strips or tines 22 of the inner row relative to the strips or tines 22 of the outer row and, their triangular configuration, in cross-section, is an important feature of the invention since this construction assures, at least, a substantial closing of the saw-tooth spaces presented by the inner side of the outer row of strips or tines 22 by the interposition in said spaces of the saw-tooth facing of the strips or tines 22 presented thereto by the inner row thereof which presents its flat side facing inwardly while the outer row of strips or tines presents its flat side outwardly. Thus, when the respective rows of strips or tines 22 are distended or flexed outwardly, at least partially, as in FIGURE 3, the strips or tines 22 are separated. However, since the strips or tines 22 of the inner row are staggered or louvered in effect with respect to those of the outer row, overlapping of the spaces thus produced therebetween occurs whereby a more complete and effective closure or shield is provided on and about the periphery of a cable 38 and its tap-branch cable 40 upon the closure of the device 10 thereon for the exclusion of foreign matter from within the device.

While the invention has been illustrated and described with respect to one embodiment thereof, it is to be expressly understood that various changes and modifications may be made therein without departing from the inventive concept underlying the same. Therefore, the invention is not to be limited except as is necessitated by the prior art and the scope of the appended claims.

I claim:

1. A unitary closure device formed of insulating material for receiving a cable-tap connection therein comprising, a pair of hingedly connected complementary box-like half-sections, coactable latching means on the respective half-sections for holding the sections in closed relationship about the cable tap connection, each of said half-sections being bounded at its opposite ends by a transverse end wall, each end wall constituted by a plurality of parallel rows of aligned, flexible, comb-like tines, disposed in outwardly inclined relation, the tines in each row being spaced apart a distance less than the width of the tine, the tines in the innermost row being staggered with respect to the tines in the adjacent row, said tines being adapted to distend outwardly about the periphery of a pair of connected cables upon closure of said half-sections thereon, the tines in the innermost row filling the spaces between the tines in the next adjacent row thereby substantially shielding said cable tap connection.

2. A unitary closure device as set forth in claim 1 wherein said comb-like tines are of triangular cross-section, adjacent rows of tines having the tine edges disposed in face to face relation.

3. A unitary closure device as defined in claim 2 wherein the upper inner edges of the tines in the innermost row are rounded to facilitate the free distention thereof outwardly upon forced contact with the peripheral surface of a cable.

References Cited by the Examiner

UNITED STATES PATENTS 3,147,338 9/1964 Ekvall et al. _____ 174—71 X
3,183,302 5/1965 Wochner et al. _____ 174—92 X

FOREIGN PATENTS 117,776 5/1930 Austria.
775,997 5/1957 Great Britain.

ROBERT K. SCHAEFER, *Primary Examiner.*

LARAMIE E. ASKIN, *Examiner.*